United States Patent [19]

Hartman

[11] Patent Number: 4,514,430
[45] Date of Patent: Apr. 30, 1985

[54] PROCESS FOR PREPARING BAKED GOODS WITH IMPROVED FLAVOR AND FLAVOR CHIP TEXTURE

[75] Inventor: Kenneth T. Hartman, Irving, Tex.

[73] Assignee: Frito-Lay, Inc., Dallas, Tex.

[21] Appl. No.: 517,812

[22] Filed: Jul. 27, 1983

[51] Int. Cl.$^3$ ............................................... A21D 2/00
[52] U.S. Cl. .................................... 426/549; 426/552; 426/560; 426/631; 426/653
[58] Field of Search ............... 426/549, 552, 553, 554, 426/555, 560, 653, 523, 496, 307, 631, 89, 98, 99, 603

[56] References Cited

U.S. PATENT DOCUMENTS

| | | | |
|---|---|---|---|
| 2,851,365 | 9/1958 | Perrozzi | 426/560 |
| 3,433,649 | 3/1969 | Cooke et al. | |
| 3,516,836 | 6/1970 | Shea | 426/554 |
| 3,582,353 | 6/1971 | Fehr et al. | 426/549 |
| 3,589,914 | 6/1971 | Cooper et al. | 426/560 |
| 4,360,534 | 11/1982 | Brabbs et al. | |

OTHER PUBLICATIONS

Wooten, M. et al., *Chem. Ind.*, 32: 1052–1053 (1970).

*Primary Examiner*—Raymond Jones
*Assistant Examiner*—Marianne S. Minnick
*Attorney, Agent, or Firm*—Bernard, Rothwell & Brown

[57] ABSTRACT

In a process for preparing baked goods containing flavor chips, wherein the baked goods have overall improved flavor and the flavor chips have improved flavor and texture, the flavor chips are pre-soaked in fluid, edible oil under oil-absorbing conditions until the flavor chips contain at least about 33% by weight of oil and fat. The mixture of oil and chips is then chilled to a temperature at which the flavor chips are substantially solid. The oil-chip mixture is then mixed with a dough or batter, wherein the soaking oil becomes a portion of the oil or fat content of the dough or batter, dispensing oil soluble flavor components of the flavor chips throughout the dough or batter. Baked goods made with dough or batter prepared according to the present invention have enhanced flavor, and flavor chips of soft texture.

21 Claims, No Drawings

PROCESS FOR PREPARING BAKED GOODS WITH IMPROVED FLAVOR AND FLAVOR CHIP TEXTURE

BACKGROUND OF THE INVENTION

1. Field of the Invention

The present invention relates to a process for the preparation of baked goods containing flavor chips in which the overall flavor and texture are improved. In addition to improvements which are made in the crumb portion, there are also improvements in the texture and flavor of the flavor chips.

2. Description of the Background Art

Many popular forms of baked goods contain flavor chips, including cookies and, more recently, certain types of cakes and biscuits. The flavor chips typically consist substantially of fats, sugars and flavoring materials. Chocolate flavored chips have been the traditional favorite, but butterscotch and peanut butter-flavored chips have become quite popular.

The general procedure for the commercial preparation of a flavor chip cookie dough is as follows (minor substitutions of the ingredients may occur from product to product, but the steps in the procedure are essentially the same): sugar, whey solids, egg powder, salt, and shortening are weighed out first and mixed. Mixing is discontinued and emulsifier and flavors are added after which the dough is mixed again. At this point, honey, water, and ammonium bicarbonate or similar materials are added and the dough is mixed. Flour and sodium bicarbonate are then added and mixed. At this point the dough is fairly stiff and chocolate or other chips are added after which mixing is continued until all chips are blended. This mixing step should be accomplished in minimum time, usually 30–45 seconds.

In baked goods containing conventional chips, the chips usually melt during the baking, remain soft for several hours thereafter, and then generally resolidify. Freshly baked products containing soft chips are often preferred by consumers as having improved texture and enhanced chip flavor.

It is an object of the present invention to provide a process of preparing a dough or batter which, after baking, will result in a product of noticeably superior flavor and texture.

It is a further object of the present invention to provide a process for producing ready to serve baked products with enhanced flavor and soft textured flavor chips which resemble the texture and flavor of conventional freshly baked chip-containing products.

SUMMARY OF THE INVENTION

In accordance with the present invention, a process for preparing a dough or batter to be used in making baked goods containing flavor chips comprises soaking flavor chips in oil, under oil-absorbing conditions, before adding the chips and oil to the balance of the dough or batter ingredients. As a result of this process, baked goods of improved flavor and texture are produced.

DETAILED DESCRIPTION OF THE INVENTION

The present invention provides a process for preparing a dough or batter to be used in making baked goods containing flavor chips. According to the invention, flavor chips are subjected to a soaking pretreatment prior to the incorporation of the chips into the dough or batter. The flavor chips are soaked in a portion of the oil which will become a part of the dough or batter formulation. As a result of this process, an unusual and unique product is produced.

Flavor chips refer herein to confectionery products which are substantially solid at room temperature and contain fats or oils, sugars and flavoring materials. Examples of common flavor chips include chocolate-, butterscotch-, and peanut butter-flavored chips. Commercially available flavor chips generally have a fat or oil content within the range of from about 24% to about 29% by weight. While the present invention is applicable to any type of flavor chip, chocolate chips are particularly preferred for treatment according to this process.

Baked goods herein refer to any bakery product which may contain flavor chips, e.g., cookies, cakes, biscuits, crackers, and the like. Cookies are particularly preferred baked goods when prepared using flavor chips treated according to the present invention.

According to the process of the present invention, flavor chips are immersed in a fluid, edible oil and soaked therein under oil-absorbing conditions. Oils suitable for use according to the present invention are those which are substantially fluid at temperatures below about 100° F., and preferably contain less than 20% crystalized oil at about 80° F. Particularly preferred oils are partially hydrogenated vegetable oils such as soybean, cottonseed and palm oils, and the like.

The flavor chips are soaked in oil at a temperature within the range of from about 80° F. to about 180° F. until the oil and fat content of the chips is raised to at least about 33% by weight, preferably from about 34% to about 38% by weight or more. It is preferred that the oil be heated to the desired temperature prior to addition of the chips, as soaking times may thereby be more easily controlled. Satisfactory results may, however, be achieved according to the present invention by adding the chips to the oil prior to heating, where the temperature to which the oil is to be heated is below about 110° F.

In preferred embodiments, the oil is heated to a temperature of from about 110° F. to about 150° F. prior to addition of the flavor chips, with an oil temperature of about 130° F. being particularly preferred.

The soaking time is dependent upon the temperature of the oil, i.e., lower oil temperatures require longer soaking times. The oil may be heated to the desired temperature, and maintained at that level during the duration of the soak. This is the preferred method when soaking temperatures at or below about 110° F. are utilized. For example, when flavor chips are added to oil at a temperature of about 80° F., the mixture is maintained at that temperature, and a soaking time of from about 20 to about 40 hours is required.

Alternatively, when flavor chips are mixed with oil which has been heated to temperatures in excess of about 110° F., it is preferred that addition of heat be terminated upon addition of the chips, and the mixture be allowed to gradually cool down during the soak. For example, when chips are added to oil at a temperature of from about 110° F. to about 150° F., the mixture is allowed to cool down to from about 75° F. to about 85° F. during the soak. This usually takes from about 15 to about 30 minutes.

When flavor chips are added to oil heated to a temperature in excess of 150° F., it is preferred that the mixture be allowed to cool down to about 110°–115° F. during the soak, and the duration of the soak is from about 5 to about 10 minutes.

In order to provide for efficient absorption of oil by the chips, it is advantageous that the chips be completely covered with oil. Generally, mixtures of about 38% oil and 62% chips have proven satisfactory. However, higher levels of oil work equally well.

As the chips absorb oil, a portion of their flavoring dissolves in the oil and disperses therein, imparting the oil with the flavor of the chips. Agitation of the mixture is preferably avoided as this causes deformation and dissolution of the chips.

When the oil and fat content of the chips has been raised to at least about 33% by weight, but before the chips lose their shape and melt in the oil, the oil-chip mixture is chilled to a temperature at which the chips are solid enough to be admixed with a dough or batter, preferably below about 40° F. The oil-chip mixture is then added to a dough or batter formulation which is at a temperature at which the chips will not melt during mixing and shaping. A dough or batter temperature within the range of from about 45° F. to about 55° F. is preferred, with a temperature of about 50° F. being particularly preferred.

According to the process of the present invention, the oil in which the flavor chips are soaked becomes a portion of the shortening content of the dough or batter with which it is mixed, and thus distributes some of the oil soluble flavor chip components throughout the dough. After mixing and forming, the dough or batter is baked under conditions suitable for the product being made. Alternatively, the chip-containing dough may be formed with another dough prior to baking to produce a layered or "dual texture" baked product. The latter method is particularly suitable for producing "dual texture" cookies, e.g., cookies with a soft and chewy inner portion and a crisp and crunchy outer portion.

Flavor chips treated according to the present invention are softer in texture than conventional chips in baked goods made therewith. The process also results in enhancement of the chip flavor in the baked goods. This is presumably due to small amounts of chip flavoring being dissolved in the oil during the soak, and to the softening and lowering of the melting point of the chips through absorption of oil. The enhancement of flavor and softer chips are similar to those found in fresh homemade chip-containing baked goods.

The invention is further illustrated by the following examples, which are not intended to be limiting.

EXAMPLE I

Partially hydrogenated soybean oil is heated to a temperature of 130° F. Chocolate chips are added to the oil such that they are completely covered by the oil and the ratio of oil to chips is 38:62 (wt/wt). Addition of heat is terminated after mixing the chips with the oil, and the mixture is allowed to cool to about 85° F. The mixture is then chilled to 40° F.

EXAMPLE II

The product produced according to Example I is mixed into cookie dough at a temperature of 50° F. The dough is then formed into cookie shapes and baked under cookie baking conditions resulting in chocolate chip cookies with enhanced chocolate flavor and soft chocolate chips.

EXAMPLE III

Partially hydrogenated soybean oil is heated to 130° F. Chocolate chips are added to the oil such that they are completely covered by the oil and the ratio of oil to chips is 38:62 (wt/wt). Addition of heat is terminated after mixing the chips with the oil, and the mixture is allowed to cool to 80° F., whereupon it is chilled to 40° F. The mixture is mixed into a cookie dough at a temperature of 50° F. The dough is then baked under cookie baking conditions resulting in chocolate chip cookies with enhanced chocolate flavor and soft chocolate chips.

EXAMPLE IV

The process of Example III is repeated with the exception that butterscotch-flavored chips are substituted for chocolate chips. Butterscotch chip cookies with enhanced butterscotch flavor and soft chips are produced.

EXAMPLE V

The process of Example III is repeated with the exception that peanut-butter-flavored chips are substituted for chocolate chips. Peanut-butter chip cookies with enhanced peanut-butter flavor and soft chips are produced.

EXAMPLE VI

Partially hydrogenated cottonseed oil is heated to a temperature of 95° F. and maintained at about that temperature for 3 hours after chocolate chips are added. The ratio of oil to chips is 38:62 (wt/wt), and the chips are completely covered by the oil during the soak. After the 3 hour soak, the mixture is chilled to 46° F. and added to cooking dough at a temperature of 46° F. The dough is then baked under cookie baking conditions resulting in chocolate chip cookies with enhanced chocolate flavor and soft chocolate chips.

EXAMPLE VII

The process of Example VI is repeated except that the oil is heated to 80° F. and maintained at about that temperature for 24 hours after the chips are added. The mixture is then chilled to 32° F. and added to the cookie dough. Chocolate chip cookies with enhanced chocolate flavor and soft chocolate chips are produced.

EXAMPLE VIII

The process of Example III is repeated except that partially hydrogenated palm oil is heated to 180° F. and allowed to cool to 115° F. after the chips are added. The mixture is chilled to 40° F. and mixed with cookie dough at a temperature of about 60° F. Chocolate chip cookies with enhanced chocolate flavor and soft chocolate chips are produced.

EXAMPLE IX

The product produced according to Example I is mixed into yellow cake batter at a temperature of 50° F. The batter is baked under yellow cake baking conditions. Yellow cake with enhanced chocolate flavor and soft chocolate chips is produced.

What is claimed is:

1. A process for preparing a dough or batter to be used in making baked goods, wherein the contents of said dough or batter include flavor chips and edible oil or fat, comprising:

(a) pre-mixing said flavor chips with a fluid, heated edible oil, said oil having a melting point below about 100° F.;
(b) soaking said flavor chips in said oil, without melting said flavor chips, until the oil and fat content of said flavor chips is at least about 33% by weight;
(c) chilling said mixture of oil and flavor chips to a temperature at which said flavor chips are substantially solid; and
(d) admixing said chilled mixture of oil and flavor chips with a dough or batter.

2. The process of claim 1 wherein said fluid, edible oil is at a temperature within the range of from about 80° F. to about 180° F. when said flavor chips are mixed therewith.

3. The process of claim 2 wherein said flavor chips are soaked in said fluid, edible oil for from about 5 minutes to about 40 hours prior to chilling said mixture.

4. The process of claim 3 wherein said flavor chips are covered with said oil during the soaking.

5. The process of claim 4 wherein said oil contains less than about 20% crystallized oil at about 80° F.

6. The process of claim 5 wherein said oil is partially hydrogenated vegetable oil.

7. The process of claim 6 wherein said oil is selected from the group consisting of soybean oil, cottonseed oil, palm oil, and mixtures thereof.

8. The process of claim 7 wherein said mixture of oil and flavor chips is chilled to a temperature of below about 40° F. after soaking.

9. The process of claim 8 wherein said dough or batter is at a temperature at which said flavor chips will not melt during said admixing of said mixture of oil and flavor chips with said dough or batter.

10. The process of claim 9 wherein said dough or batter is at a temperature within the range of from about 45° F. to about 55° F. during said admixing of said dough or batter with said mixture of oil and flavor chips.

11. The process of claim 10 wherein said fluid, edible oil is pre-heated to a temperature within the range of from about 110° F. to about 150° F. prior to mixing with said flavor chips, said flavor chips are then mixed with said fluid, edible oil, and said mixture is allowed to cool down to from about 75° F. to about 100° F. without further addition of heat after adding said flavor chips and prior to chilling said mixture.

12. The process of claim 11 wherein said fluid edible oil is pre-heated to a temperature of about 130° F. prior to mixing with said flavor chips, said flavor chips are then mixed with said fluid, edible oil, and said mixture is allowed to cool down to from about 80° F. to about 85° F. without further addition of heat after mixing said flavor chips and prior to chilling said mixture.

13. The process of claim 12 wherein said dough or batter is at a temperature of about 50° F. during said admixing of said dough or batter with said chilled mixture of oil and flavor chips.

14. The process of claim 13 wherein said mixture of oil and flavor chips is at a ratio of oil to flavor chips of from about 38:62 (weight/weight).

15. The process of claim 4 wherein said flavor chips are chocolate-flavored chips, butterscotch-flavored chips, or peanut butter-flavored chips, or a mixture thereof.

16. The process of claim 9 wherein said flavor chips are chocolate-flavored chips, butterscotch-flavored chips, or peanut butter flavored chips, or a mixture thereof.

17. A process for preparing chocolate chip cookies comprising:
(a) heating partially hydrogenated vegetable oil to a temperature of about 130° F., said oil containing less than about 20% crystallized oil at about 80° F.;
(b) mixing chocolate-flavored chips with said heated oil, said heated oil completely covering said chocolate-flavored chips;
(c) soaking said chips in said oil without the further addition of heat to said mixture until said mixture cools to a temperature of from about 80° F. to about 85° F.;
(d) chilling said mixture to below about 40° F.;
(e) admixing said mixture with a cookie dough, said cookie dough being at a temperature of about 50° F. during the mixing of said cookie dough with said mixture of oil and chocolate-flavored chips;
(f) forming said cookie dough into cookie shapes; and
(g) baking said cookies under cookie baking conditions.

18. A process for preparing a dough or batter to be used in making baked goods, wherein the contents of said dough or batter include flavor chips and edible oil or fat, comprising:
(a) soaking said flavor chips in a fluid, heated edible oil, without melting said flavor chips, until the oil and fat content of said flavor chips is at least about 33% by weight, said oil having a melting point below about 100° F.;
(b) chilling said mixture of oil and flavor chips to a temperature at which said flavor chips are substantially solid; and
(c) admixing said chilled mixture of oil and flavor chips with a dough or batter.

19. The process of claim 18 wherein said heated oil is at a temperature within the range of from about 80° F. to about 180° F. when said flavor chips are soaked therein.

20. The process of claim 19 wherein said flavor chips are soaked in said heated oil for from about 5 minutes to about 40 hours prior to chilling said mixture, and said flavor chips are covered with said heated oil during the soaking.

21. The process of claim 20, wherein said heated oil contains less than about 20% crystallized oil at about 80° F., said mixture of oil and flavor chips is chilled to a temperature of below about 40° F. after soaking, and said dough or batter is at a temperature within the range of from about 45° F. to about 55° F. during said admixing of said dough or batter with said mixture of oil and flavor chips.

* * * * *